OFFSHORE DRILLING

Original Filed Aug. 28, 1948 3 Sheets-Sheet 1

INVENTOR.
JAMES M. McNEILL,
BY Ross J. Garofalo
ATTORNEY.

INVENTOR.
JAMES M. McNEILL,
BY Ross J. Garofalo
ATTORNEY.

INVENTOR.
JAMES M. McNEILL,
BY Rosso J. Garofalo
ATTORNEY.

United States Patent Office

Re. 24,083
Reissued Nov. 1, 1955

24,083

OFFSHORE DRILLING

James M. McNeill, Los Angeles, Calif., assignor to Union Oil Company of California, Los Angeles, Calif., a corporation of California Original No. 2,606,003, dated August 5, 1952, Serial No. 46,573, August 28, 1948. Application for reissue June 28, 1954, Serial No. 439,951

11 Claims. (Cl. 255—2.5)

Matter enclosed in heavy brackets [ ] appears in the original patent but forms no part of this reissue specification; matter printed in italics indicates the additions made by reissue.

This invention relates generally to the drilling of oil and gas wells in formations underlying deep water. More particularly, this invention relates to the drilling of wells into formations underlying the ocean or other rough and deep waters wherein the drilling rig is mounted on a floating barge.

In the prior art, wells have been drilled into submarine formations by the construction of solid installations on the floor of the body of water to provide a stationary framework or structure from which a platform is supported which carries the drilling rig and other equipment. Such permanent structures as rock fills, piling and caissons have been employed for this purpose. Other prior art relates to submerging one of several kinds of floating barges in the water over the formation to be drilled so that when the hull of the barge and/or special extensible supports rest on the bottom, the superstructure of the barge is supported above the water level. The drilling equipment is carried on a platform supported by the superstructure.

The methods described in the prior art are limited by the depth of the water in which they can be successfully carried on and also by the extent of the wave action tending to destroy or upset the installation. The economics of permanent deep water installations is prohibitive and the size of the submersible barge and other equipment necessary for operating in water deeper than 20 to 150 feet renders the equipment unwieldy, and unsafe, especially during rough weather.

It is, therefore, an object of this invention to provide a method and apparatus for the drilling of oil and gas wells in rough and/or deep water such as in open seas, large lakes, river channels possessing currents and tidal action and the like.

It is another object of this invention to provide a rotary drilling method for the drilling of oil or gas wells from a floating barge anchored in the open seat or in rough water.

Another object of this invention is to provide a mobile apparatus for drilling wells which is especially suitable for use in rough water ranging from 150 to 400 feet or more in depth.

It is another object of this invention to provide a method and apparatus for supporting a part of a rotary drill string on the deck of the floating barge such that substantially a constant weight can be maintained on the drill bit and such that continuous contact is maintained between the drill bit and the formation being drilled during the vertical and lateral shifting of the floating barge resulting from wave action.

It is another object of this invention to provide a conductor tube communicating between the floating barge and a point on the ocean floor which provides for the return of the rotary drilling fluid from the well bore to the floating barge, and which includes means for compensating for the vertical and lateral shifting of the barge resulting from surface wave action.

It is another object of this invention to provide a method and apparatus for mounting a rotary drilling table on the surface of a floating barge whereby the rotary drilling table is maintained in substantially a horizontal plane during the vertical and lateral shifting of the floating barge resulting from surface wave action.

It is another object of this invention to provide an arrangement of equipment on a floating barge to be employed for drilling purposes wherein the arrangement contributes to the maximum stability of the barge during vertical and lateral shifting occasioned by surface wave action.

Briefly, this invention relates to the drilling of oil and gas wells into formations underlying the ocean or other rough and/or deep waters wherein the drilling operation is conducted from a floating barge. The barge is floated over the drilling location and is securely anchored to the floor of the ocean. The barge is equipped with conductor tube which is of relatively large diameter relative to the diameter of the drill string and other tools and is of sufficient length to extend from the barge to an anchorage in or on the submarine formation to be drilled. The conductor tube is fitted with flexible and extensible joints in order to accommodate the usual vertical and horizontal shifting of the anchored barge relative to the formation resulting from surface wave action. The lower end of the conductor tube is anchored to the formation by any suitable method. For example, a connecting pipe is hammered or otherwise positioned in the formation surface and the conductor tube is coupled to the protruding end of the pipe. Alternatively a large block of cement enclosing a connecting pipe is submerged at the drilling site in such a way that the cement block rests on the ocean floor with the upper end of the pipe extending vertically through the top side of the cement block. The conductor tube is then fastened to the vertical extension of the connecting pipe. The drilling tools are then passed from the barge through the conductor tube to the formation. The drilling operation itself may be effected by any suitable method such as cable tool drilling, sonic vibration actuated tool drilling, rotary drilling and the like.

Among the various drilling methods which may be employed in this invention it is preferable to employ rotary drilling. For this purpose the barge is equipped with a crane, guyed mast equipped with draw works, or other such device for raising, lowering and supporting the drill string; a rotary drilling table; a driving means such as a gasoline engine, electric motor or the like; a pipe storage rack; drilling fluid storage tanks and pumps, and other equipment necessary for rotary drilling. The pipe rack preferably extends below the hull of the barge and provides for the vertical storage of pipe in order that greater stability of the barge may be obtained thereby. The rotary drilling table is suitably mounted on the barge at the top of the conductor tube.

In the preferred method for mounting the drilling table, it is suspended within a torque ring in such a manner that the axis of suspension includes one diameter of the drilling table and one diameter of the torque ring. The torque ring is suspended on a ring gear such that it has free movement about a suspension axis through its diameter which is perpendicular to the suspension axis of the drilling table.

The aforedescribed method of suspension, which is commonly referred to as gimbals, permits the drill string to be rotated through its coupling to the drilling table in a manner which minimizes the excessive bending of the drill string which otherwise occurs when the drilling table must rotate in a fixed plane relative to the deck of the barge and when the barge is then shifted horizontally relative to the bore hole in the formation or when the deck of the barge is inclined to the horizontal plane as a result of wave action. The horizontal shifting of the barge relative to the bore hole bends the drill string above the bore hole and inclines the top of the drill string at varying small angles relative to the vertical. The gimbals allow the drilling table to be rotated in substantially constant planar relationship relative to the formation. The gimbals also permit the drilling table to adjust its rotational planes continuously relative to the movement of the barge to conform to longitudinal axis of the drill string, which is generally perpendicular or nearly perpendicular to the horizontal plane, during its rotation and during the shifting and pitching of the barge as a result of wave action.

In drilling from the barge by the rotary method a means is inserted into the drill string at a suitable location to maintain the drill bit in substantially constant contact with the formation during the vertical and lateral shifting of the barge due to wave action. One modification of such means comprises an extensible splined sub which transmits torque at varying positions of extension and contraction. The weight of the upper section of drill string which is above the splined sub is supported from a crane on the deck of the barge, while the weight of the lower section of drill string which is below the splined sub rests on the drill bit and provides a constant loading for the drill. The movement of the barge during wave action raises and lowers the guyed mast, or other support, relative to the formation thereby raising and lowering the upper section of drill string. Such movement is, however, without effect on the lower section of drill string.

During rotary drilling a drilling fluid of any suitable type is circulated downwardly through the drill string, out the drill bit and rises through the annular space and into the conductor tube from which it is withdrawn and pumped to the screening and storage tanks.

Figure 1:
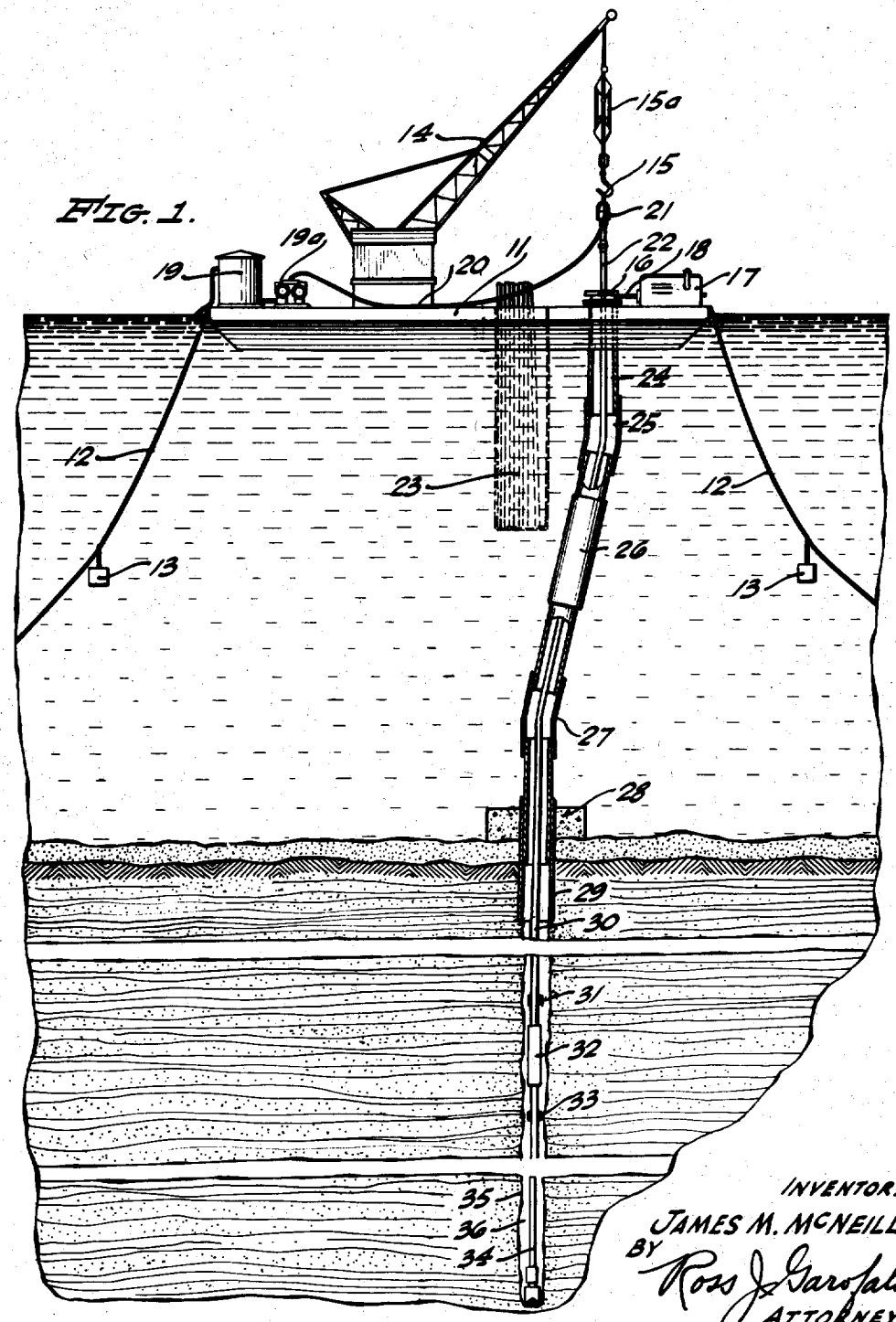
Figure 1 shows an overall diagrammatic view of one form of this invention in which rotary drilling equipment is mounted on a floating barge which is anchored over a formation being drilled and wherein the rotary drilling tools are passed from the barge to the formation through an intervening conductor tube having flexible and extensible joints.
Figure 5:
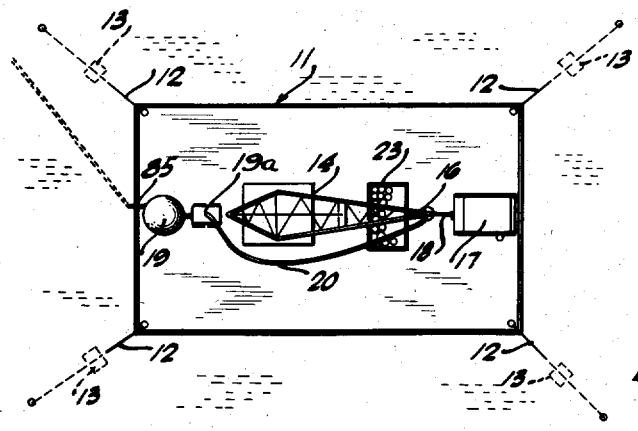
Figure 5 shows a deck view of the anchored barge.

Referring now more particularly to the attached figures 1 and 5, the floating barge is anchored over the formation by means of lines 12 leading from each of the four corners of the barge to suitable anchorages such as concrete blocks, dolphins, hooks and the like. Suspended counterweights 13 hang from lines 12 and provide additional stability to the anchored barge. Barge 11 is equipped with guyed mast 14 and pulley hook 15 or other suitable means for raising, lowering and supporting the drill string 30, drilling fluid storage tanks 19, drilling fluid pump 19*a*, drilling fluid line 20, drill pipe storage rack 23, and a gasoline driven engine 17 or other power source, drive shaft 18, rotary drilling table 16 and conductor tube 24 which is flexible and extensible and communicates between barge 11 and connecting pipe 29 lodged in the submarine formation. The conductor tube is of large internal diameter relative to the external diameter of the drill string and may, for example, be from two to ten or more times larger.

The pipe storage rack provides for the vertical storage of the drill pipe and extends below the hull of the barge such that the center of gravity of the pipe being stored is below the center of gravity of the barge as a whole. The mass of the stored pipe helps to stabilize the barge during wave action.

Rotary drilling table 16 is mounted on bearings which permit its surface to remain in substantially a horizontal plane during the vertical and lateral shifting of the barge as is hereinafter described. Rotary table 16 is rotated by gasoline engine 17 through shaft 18.

Conductor tube 24 communicates between rotary drilling table 16 and the formation and comprises flexible joints 25 and 27 and extensible joint 26 to provide compensation for the vertical and lateral shifting of the barge relative to the formation. Flexible joints 25 and 27 shown in Figure 1 comprise sections of heavy large diameter rubber hose. Other flexible joints such as the ball in socket type described hereinafter, articulated pipe and the like may also be employed. Extensible joint 26 is a large diameter slip joint of the type described hereinafter in detail. Conductor tube 24 is anchored to the formation through large concrete block 28 and connecting pipe 29. Connecting pipe 29 is shown as extending a short distance into the formation in order to seal the well bore and prevent the intrusion of extraneous water and the loss of drilling fluids. If desired, a well casing can be cemented into the well bore below the connecting pipe in order to improve the seal.

Drill string 30 comprises kelly 22 which is supported by means of swivel joint 21 and hook 15 and draw works 15a from guyed mast 14, drill pipe, a splined sub 32 or other extensible torque-transmitting means which is inserted in the string of drill pipe at some desired point by means of collar joints 31 and 33, and drill bit 34. The splined sub divides the drill string into two sections. The weight of the upper section is principally supported from the barge by guyed mast 14 through hook 15, swivel joint 21 and kelly 22. The weight of the lower section is rested on the drill bit 34 at the bottom of bore hole 35 and provides a substantially constant loading of the drill bit. As the floating barge is shifted vertically or horizontally relative to the formation as a result of wave action, the crane 14 raises and lowers the upper section of the drill string relative to the formation and the splined sub expands and contracts to prevent any vertical movement of the lower section of the drill string by the wave action. Torque is continuously transmitted between the upper and lower sections during all positions of extension and contraction of the splined sub.

The rotation of rotary table 16 by power source 17 and shaft 18 is transmitted to the kelly 22 by means of kelly bushings and the entire drill string is rotated thereby. Drilling fluid flows from storage 19 through pump 19a and line 20 into swivel joint 21, downward through the drill string 30 to drill bit 34, out of drill bit 34 into the annular space 36 between the drill string 30 and the formation 35, up through the annular space to casing 29 and through casing 29 and conductor tube 24 from which it is removed through a line below the top of the conductor tube, screened, and returned to storage 19.

Figure 2:
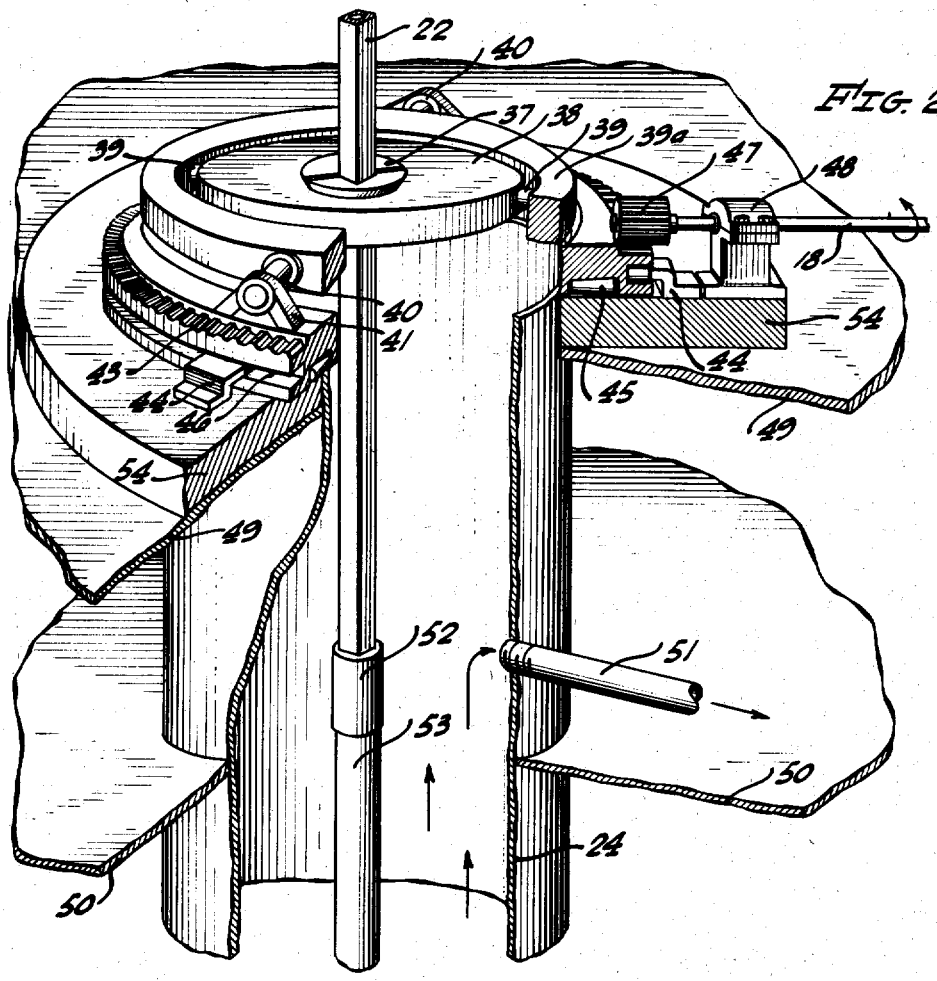
Figure 2 shows a cutaway view of the rotary drilling table showing its suspension, mounting, driving means and other related equipment.

Referring now more particularly to Figure 2, conductor tube 24 is fitted into a circular hole in the center of drilling platform 54. Below the drilling platform 54 the conductor tube passes through deck 49 and hull 50 of the barge and extends downward to the connecting pipe lodged in the formation being drilled. The conductor tube 24 is tightly sealed in the hull 50 in order to prevent leakage of sea water into the hold of the barge.

Kelly 22 is coupled to rotary drilling table 38 by means of kelly bushings 37. Drilling table 38 is suspended within torque ring 39a by bearings 39 in a manner which permits free movement about a suspension axis which includes a diameter of the drilling table and at the diameter of the torque ring. Torque ring 39a is suspended by bearings 40 in journals 41 which provide for the free movement of the torque ring about a suspension axis through journals 41 which includes the diameter of the torque ring which is perpendicular to the suspension axis of drilling table 38 through bearings 39. Journals 41 are in turn mounted on ring gear 43 which is supported on drilling table platform 54 by roller bearings 45. Ring gear 43 is maintained in continuous contact with bearings 45 by means of bearings which ride in groove 46 cut into the periphery of ring gear 43 and which are held in a fixed axis of rotation relative to the drilling table platform 54 by means of rigid anchoring arms 44 which are fastened to the drilling table platform 54. Ring gear 43 is driven by meshing gear 47 on power shaft 18. Shaft 18 is mounted in bearings housed in journal 48 which is secured to drilling table platform 54. Drilling table platform 54 is secured to barge deck 49.

The rotation of shaft 18 by a suitable power source, such as a gasoline engine, rotates ring gear 43 about a fixed axis in a fixed rotational plane which is parallel to the plane of deck 49 of the barge 11. Ring gear 43 rides on roller bearings 45 and any forces tending to dislodge the ring gear 43 from its fixed axis and plane of rotation relative to barge deck 49 are opposed by the peripheral bearings held by anchoring arms 44. The rotation of ring gear 43 is transmitted through journals 41 and bearings 40 to torque ring 39a. Torque ring 39a is rotated about an axis perpendicular to barge deck 49 and its surface is inclined at various angles to its plane of rotation which angles are determined by the instantaneous positions of the barge relative to the drill string. The movement of torque ring 39a in a rotational plane which is generally, but not always, inclined to the surface of the torque ring causes a rotary thrust on bearings 39 which suspend rotary drilling table 38. The rotation of table 38 occurs in a plane which is in general not coincident with the plane of torque ring 39a and is about an axis which is substantially vertical. The rotation of drilling table 38 in substantially a horizontal plane transmits a torque through kelly bushings 37 to kelly 22. Kelly 22 is coupled through collar coupling 52 to drill string pipe 53, which is in turn fastened by suitable couplings to the remaining components of the drill string.

The shifting of the barge 11 relative to the submarine formation being drilled as a result of wave action bends the drill string above the formation and in the conductor tube. This bending is taken up by the elasticity of the drill string which, in cetrain cases, may be purposely fabricated from spring steels or from special alloy steels which are highly elastic and have high shear strength. The bending of the drill string tends to incline the longitudinal axis of the kelly at some small angle relative to the vertical. The small inclination of the longitudinal axis of the kelly at the point of coupling to kelly bushings 37 is accommodated by the self-adjustment of drilling table 38 and its coupling through bearing 39, torque ring 39a, bearings 40 and journal 41 to ring gear 43 whereby the table is inclined and the torque exerted on kelly 22 is substantially about its longitudinal axis and such that the forces tending to rotate kelly 22 about an axis other than its longitudinal axis are thereby minimized or are nullified.

The drilling fluid flows downward through hollow kelly 22, coupling 52, drill pipe 53 through the remainder of drill string 30, out drill bit 34 and upward through the annular space 36, through connecting pipe 29 or other form of casing and through conductor tube 24. The returning drill fluid containing the drill cuttings is removed from the conductor tube 24 through discharge line 51 from which it is pumped to screening for removal of the drill cuttings and thence to drilling fluid storage tanks 19 for re-use.

Figure 3:
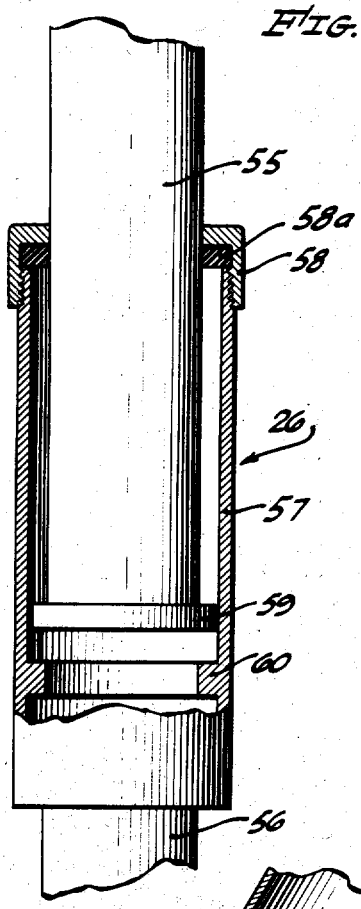
Figure 3 shows a slip joint which is one modification of the extensible means by which the conductor tube adjusts its length during the vertical and lateral shifting of the barge.

Referring more particularly to Figure 3, annular ring 59 is integrally and coaxially attached to the lower end of sliding member 55. The annular ring 59 moves coaxially within sheath 57 between the lower limit imposed by constriction 60 in sheath 57 and the upper limit imposed by seal ring 58 which is threaded to the upper end of sheath 57 and prevents the complete withdrawal of annular ring 59 and integrally attached sliding member 55 from sheath 57. The annular space between sliding member 55 and seal ring 58 is sealed by packing gland 58a which prevents leakage of sea water into the joint and loss of drilling fluid from the joint. The top of sliding member 55 is threaded through a collar joint to the upper section of the conductor tube adjacent to the slip joint. The lower end of sheath 57 is internally threaded to member 56 which is the lower section of the conductor tube adjacent to the slip joint. The entire slip joint is provided with a large diameter longitudinal channel which permits the passage of the drill string through the entire joint.

Figure 4:
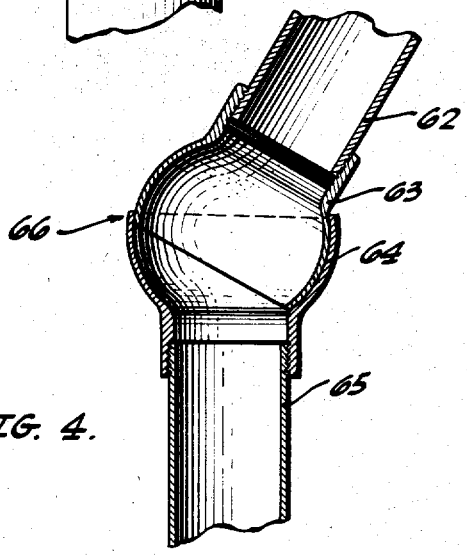
Figure 4 is a flexible ball and socket type modification of the flexible joint which is employed to provide the conductor tube with flexible means to adjust its shape during the vertical and lateral shifting of the barge.

Referring now more particularly to atached Figure 4, members 63 and 64 comprise two machined concentric spherical sections which are threaded to pipes 62 and 65 respectively. The movement of inner spherical member 63 relative to and in concentric relationship to outer spherical member 64 permits pipe 62 which is attached to inner spherical member 63 to be inclined relative to pipe 65 which is attached to outer spherical member 64. The varying inclination of pipes 62 and 65 which comprise sections of the conductor tube respectively provides the conductor tube with flexibility about the joint.

Figure 7:
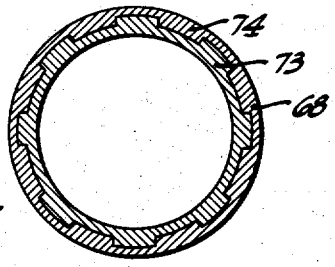
Figure 7 shows a section of the splined sub shown in Figure 6 taken along the line 7—7.
Figure 6:
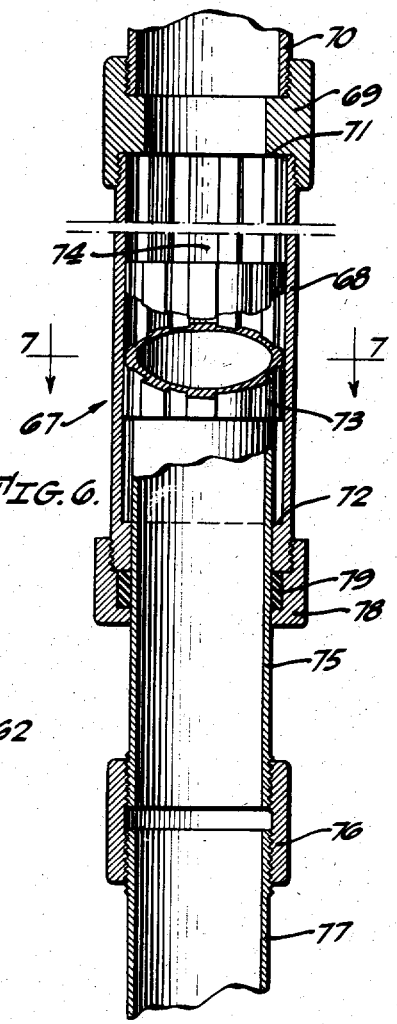
Figure 6 shows a splined sub which is inserted in the drill string to allow the drill string to extend and contract as the crane on the barge is raised and lowered relative to the formation whereby the drill bit can be maintained in substantially continuous contact with the formation being drilled during such raising and lowering.

Referring more particularly to Figures 6 and 7, drill string member 70 is threaded to the top of the splined sub 67 by means of collar joint coupling 69. Sheath 68 is internally splined with longitudinal splines 74 which engage the longitudinal splines of annular ring 73 which ring is integrally attached to the upper end of sliding member 75. Splined annular ring 73 slides lengthwise in engaging spline 74 on the inside of sheath 68 between the upper limit imposed by the flat machined constriction 71 of collar joint coupling 69 and the seating 72 at the lower end of engaging splines 74. The lower section of sliding member 75 extends through the lower end of sheath 68 and seal ring 78, the latter being threaded to the lower end of the sheath. The annular contact between seal ring 78 and sliding member 75 is sealed by packing gland 79 which prevents loss or gain of drilling fluid from or to the sub. The lower end of sliding member 75 is threaded to adjacent drill string member 77 through collar joint coupling 76. The sliding member 75 and splined annular ring 73 in engagement with splines 74 of sheath 68 permits the sub to be extended and contracted within the limits hereinbefore described and under conditions which maintain the sliding member and sheath in aligned coaxial relationship. A torque applied to the upper section of the joint is transmitted through sheath 68 and splines 74 to splines 73 and sliding member 75 which in turn transmits the torque to the lower section of the drill string under varying positions of extension and contraction.

In the drilling of a well by rotary methods according to the process of this invention, a barge is stocked with the essential items of equipment hereinbefore described and is floated to the location of the formation to be drilled. A concrete block which encloses a large diameter connecting pipe is submerged at the location and is positioned on the floor of the sea over the drilling site. Alternatively, a section of well casing is forced into the formation to be drilled by hammering, hydraulic drilling, twisting or the like. The barge is then anchored by lines from each of its four corners to anchorages secured to the ocean floor, such as concrete blocks, dolphins, hooks and the like and counterweights are suspended along the mid-section of the lines to increase the stability of the anchorage as hereinbefore described. The lower end of the conductor tube is fastened or coupled to the connecting pipe extending into the large cement block and/or into the formation. Such coupling can be effected by employing long connecting pipes which extend upward from the floor of the ocean to shallower water to which a diver can be dispatched to complete the attachment. Alternatively, purely mechanical, remote control methods may be employed to effect the coupling.

Following the communication of the conductor tube between the barge and the connecting pipe extending upward from the ocean floor by any suitable method, the drill string is assembled and inserted into the conductor tube by means of a crane mounted on the barge. The drill string comprises, in general, a drill bit, a section of drill pipe, a splined sub of the type hereinbefore described, an additional section of drill pipe and a kelly from which the remaining members of the drill string are supported. The kelly bushings are wedged in the drilling table around the kelly in order to couple the drill string to the drilling table. The circulation of drilling fluid into the kelly down through the drill string and upward through the pipe and conductor tube is begun.

The drill string is lowered in the conductor tube until its entire weight rests on the drill bit in contact with the formation or the cement block in the bottom of the connecting pipe, in which condition the splined sub is completed contracted. The guyed mast and draw works are then employed to raise the upper section of the drill string a distance which is somewhat greater than its maximum rise and fall resulting from wave action on the barge. Under these conditions the splined sub is never fully contracted as a result of wave action. The vertical component of the movement of the barge relative to the formation as a result of wave action is taken up by the extension and contraction of the splined sub and the drill bit is maintained in continuous contact with the formation during such movement of the barge.

The drilling operation is begun by applying power to the rotary drilling table. The rotation of the drill string in conjunction with the weight of the lower section of the drill string on the drill bit causes the drill bit to pass downwardly through the successive strata. During the drilling operation the vertical component of the movement of the barge as a result of the wave action is continuously absorbed in the extension and contraction of the splined sub. As the drill bit continues its downward path through the formation the splined sub is gradually extended to maintain such motion relative to the variable position of the barge with respect to the formation.

After the bore hole has been drilled a depth equivalent to a drill stand, the drill string is raised by the draw works and guyed mast and is blocked into a supporting position by bushings on the rotary drilling table. The kelly is then detached and an additional stand of drill pipe is attached to the drill string. The kelly is attached, the drill string is lowered until its entire weight is on the drill bit. The draw works and guyed mast are then employed to raise the drill string the calculated distance which will prevent complete contraction of the splined sub as a result of a downward thrust of the barge due to wave action as has been described before. The kelly bushings are replaced, the drilling table is rotated and the drilling is then resumed in the manner described above for the first drill string.

After the drilling has progressed some distance into the formation, such as for example 200 to 1,000 feet or more, it is desirable to relocate the splined sub in the drill string at a new position which will give an increased and more optimum loading on the drill bit. For this purpose the drill string is progressively raised by the guyed mast and draw works and disassembled until the splined sub is reached and removed. Drill pipe is then added to the drill string and lowered into the conductor tube and well bore until an amount has been added such that the drill string in the conductor tube and bore hole corresponds in weight to the desired loading of the drill bit. The splined sub is reinserted and additional drill pipe is added above the splined sub until the drill bit approaches the bottom of the well bore. The kelly is attached to the drill string and the drill string is lowered until it is supported on the drill bit. The drill string is raised a distance which will prevent complete contraction of the splined sub as a result of the downward movement of the barge during wave action and is coupled to the drilling table by kelly bushings. The drilling is then resumed according to the methods described hereinbefore.

Following the completion of the well to the desired depth, the well bore is completed in any desirable fashion. The floating barge is uncoupled from the connecting pipe or other form of well casing and is moved to a new location for the drilling of additional wells.

Although the foregoing description of this invention has pertained specifically to its application to rotary drilling, it is apparent that the broad scope of this invention comprises the method of drilling an oil or gas well from a floating barge wherein there is connected between the well bore and the barge a conductor tube having both flexible and extensible means to compensate for the movement of the barge relative to the formation during wave action.

In one modification of this invention the well bore is drilled with cable tools or other percussion-type drilling tools. The conductor tube is coupled between the barge and the underlying formation in the manner described hereinbefore for the case of rotary drilling. A cable tool drilling string comprising, for example, a swivel, a set of jars, a sinker bar and a drill bit is lowered on the end of a cable into the conductor tube and connecting pipe until it rests at the bottom of the hole. The drill string is alternately raised by any suitable power source such as a gasoline engine and then allowed to fall. The weight of the drill string falling on the drill bit drives it through the formation and shatters the rock into fine cuttings. A hydraulic wash may be employed to remove the cuttings if desired.

The cable tool drilling modification of this invention is easily carried out and is advantageously employed in those cases where the drilling is conducted in extremely rough waters. The movement of the barge relative to the formation is compensated for in the conductor tube by the flexible and extensible means described hereinbefore.

The vertical component of the movement of the barge which raises and lowers the cable tool relative to the formation causes no serious problems and in general no special means is provided to compensate for such movement. The raising and falling of the drill string is generally adjusted so that when the barge is approximately at its mean height above the formation the cutting of the formation is greatest. When the barge is at its minimum height during the wave cycle, the vertical stroke of the cable tool is shortened and the drilling tool may even rest on the floor of the bore hole. As the barge rises to its maximum height during the wave cycle the vertical stroke of the cable tool is increased and the drill bit may even be temporarily lifted completely from contact with the bottom of the bore hole. Under these conditions the drilling takes place mostly during those periods of the wave cycle that the barge is near or is passing through the mean elevation. This discontinuity of the drilling presents no serious problem and in extremely rough water is justified by the simplicity of the equipment and its relative freedom from mechanical failure.

There is a general danger of blowouts in drilling high pressure formations by the cable tool method and especially in those cases where the bore hole contained little or no water seepage or added wash liquid. In such cases the conductor tube is suitably machined and fabricated to withstand the formation pressure and the top of the conductor tube is capped with suitable fitting to permit the vertical stroke of the cable and at the same time provide a seal to retain the formation pressure. By employing the conductor tube as a part of the sealing means, the well bore can be drilled by cable tools through high pressure formations.

The present apparatus may also be used in drilling offshore oil wells by means of percussion tools which are placed in contact with the formation and are actuated by sonic vibrations which serve to shatter and disintegrate the rock formation in contact with the drill bit.

Having fully described and illustrated the principles of my invention I wish to claim the following:

1. An apparatus for drilling a well in a formation underlying deep water which is subject to wave action, which apparatus comprises a floating barge, a conductor tube communicating between said floating barge and said formation and providing a fluid tight path therebetween, said conductor tube comprising a series of tubular sections joined together by at least two flexible joints and at least one extensible joint, said flexible joints and extensible joint being positioned in the conductor tube between the barge and the formation and cooperating to provide compensation for the vertical and horizontal movement of said floating barge relative to said formation produced by wave action, means for anchoring said conductor tube to said formation, a drill bit and a drill string, the outer diameters of which are substantially less than the inner diameter of said conductor tube, and means for driving said drill bit and drill string.

2. An apparatus according to claim 1 wherein said extensible joint is a slip joint.

3. An apparatus according to claim 1 wherein a pipe storage container is mounted within and extends below said floating barge to provide for the substantially vertical storage of drill pipe and wherein the mounting of the pipe storage container places said contained pipe principally below the deck of the barge thereby lowering the center of gravity of the barge and tending to stabilize said barge under wave action.

4. An apparatus for drilling a well in a formation underlying deep water which is subject to wave action, which apparatus comprises a floating barge, a conductor tube communicating between said floating barge and said formation and providing a fluid tight path therebetween, said conductor tube comprising a series of tubular sections joined together by at least two flexible joints and at least one extensible joint, said flexible joints and extensible joint being positioned in the conductor tube between the barge and the formation and cooperating to provide compensation for the vertical and horizontal movement of said floating barge relative to said formation produced by wave action, means for anchoring said conductor tube to said formation, a drill bit and a drill string, the outer diameters of which are substantially less than the inner diameters of said conductor tube, means for rotating said drill string, means for pumping a drilling fluid downwardly through a central cavity in the drill string to the bottom of the bore hole, thence upwardly through the annular space between said drill string and said formation, and thence upwardly through the annular space between said drill string and said conductor tube.

5. An apparatus according to claim 4 wherein said drill string comprises an upper section and a lower section, said upper and lower sections being joined by an extensible joint for transmitting torque at varying positions of extension.

6. An apparatus for drilling a well in a formation underlying deep water which is subject to wave action, which apparatus comprises a floating barge, a conductor tube communicating between said floating barge and said formation and providing a fluid tight path therebetween, said conductor tube comprising a series of tubular sections joined together by at least two flexible joints and at least one extensible joint, said flexible joints and said extensible joint being positioned in the conductor tube between the barge and the formation and cooperating to provide compensation for the vetrical and horizontal movement of said barge relative to said formation produced by wave action, means for anchoring said conductor tube to said formation, a drill bit and a drill string, the outer diameters of which are substantially less than the inner diameters of said conductor tube, a driving means mounted on said barge and coupled to said drill string through gimbals, means for pumping a drilling fluid downwardly through a central cavity in the drilling string to the bottom of the bore hole, thence upwardly through the annular space between said drill string and said formation, and thence upwardly through the annular space between said drill string and said conductor tube.

7. An apparatus according to claim 6 wherein said drill string comprises an upper section and a lower section, said upper and lower sections being jointed by an extensible joint for transmitting torque at varying positions of extension.

8. An apparatus according to claim 6 wherein said drill string comprises an upper section and a lower section being joined by an extensible joint for transmitting torque at varying positions of extension, and wherein a support attached to said barge principally supports the weight of said upper section of said drilling string while allowing the weight of said lower section of said drill string to rest principally on a drilling foot at the bottom of the well bore.

*9. In apparatus for drilling a well in a formation underlying deep water which is subject to wave action, the combination comprising a floating barge, a drill bit and a drill string extending downwardly from the barge, and a driving means comprising a ring adapted to rotate horizontally in a fixed position with respect to said barge, said ring being coupled to the drill string through gimbals.*

*10. In apparatus for drilling a well in a formation underlying deep water which is subject to wave action, the combination comprising a floating barge, a drill bit and a drill string extending downwardly from the barge, a driving means comprising a ring adapted to rotate horizontally in a fixed position with respect to said barge, said ring being coupled to the drill string through gimbals, and means for pumping a drilling fluid downwardly through a central cavity in the drill string to the bottom of the well, and thence upwardly through the annular space between said drill string and said formation.*

*11. In apparatus for drilling a well in a formation underlying deep water which is subject to wave action, the combination comprising a floating barge, a drill.ng table platform mounted in a fixed position on the barge and having an annular bearing surface, an outer ring rotatably disposed on the bearing surface, driving means for rotating the outer ring on said bearing surface in a fixed horizontal plane parallel to the deck of said barge, an inner torque ring mounted within the outer ring to pivot on a first diameter of the outer ring, a drilling table mounted within the inner ring to pivot on a second diameter of the outer ring, the drilling table and inner ring being adapted to rotate with the outer ring, a drill bit and a drill string extending downwardly and perpendicularly through the drilling table and coupled thereto, so as to rotate therewith about the same axis, and means for pumping a drilling fluid downwardly through a central cavity in the drilling string to the bottom of the bore hole, and thence upwardly through the annular space between said drill string and said formation.*

(References on following page)

References Cited in the file of this patent or the original patent

UNITED STATES PATENTS

| | | |
|---|---|---|
| 285,628 | Jones et al. | Sept. 25, 1883 |
| 496,729 | Fairchild | May 2, 1893 |
| 656,515 | Cassity | Aug. 21, 1900 |
| 1,357,564 | Hughes | Nov. 2, 1920 |
| 1,517,556 | Grant | Dec. 2, 1924 |
| 1,681,533 | Giliasso | Aug. 21, 1928 |
| 1,766,628 | Grant | June 24, 1930 |

| | | |
|---|---|---|
| 1,870,725 | Grant | Aug. 9, 1932 |
| 1,886,820 | Lee | Nov. 8, 1932 |
| 1,891,328 | Le Compte et al. | Dec. 20, 1932 |
| 1,971,480 | Earley | Aug. 28, 1934 |
| 2,016,042 | Lewis | Oct. 1, 1935 |
| 2,066,794 | Miller | Jan. 5, 1937 |
| 2,171,672 | Plummer | Sept. 5, 1939 |
| 2,271,974 | Greiner | Feb. 3, 1942 |
| 2,399,656 | Armstrong | May 7, 1946 |
| 2,476,309 | Lang | July 19, 1949 |